United States Patent
Langediers et al.

(10) Patent No.: US 11,840,052 B2
(45) Date of Patent: Dec. 12, 2023

(54) METHOD FOR PRODUCING A COMPOSITE COMPONENT

(71) Applicant: Airbus Operations GmbH, Hamburg (DE)

(72) Inventors: Jürgen Langediers, Syke (DE);
Berend Schoke, Twistringen (DE);
Marcel Meyer, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 2 days.

(21) Appl. No.: 17/585,041

(22) Filed: Jan. 26, 2022

(65) Prior Publication Data
US 2022/0203665 A1    Jun. 30, 2022

Related U.S. Application Data

(63) Continuation of application No. PCT/EP2020/070327, filed on Jul. 17, 2020.

(30) Foreign Application Priority Data

Jul. 30, 2019   (DE) .................. 10 2019 120 548.4

(51) Int. Cl.
*B32B 37/24* (2006.01)
*B32B 3/12* (2006.01)
(Continued)

(52) U.S. Cl.
CPC .............. *B32B 37/24* (2013.01); *B32B 3/12* (2013.01); *B32B 37/02* (2013.01); *B32B 37/06* (2013.01);
(Continued)

(58) Field of Classification Search
CPC ......... B32B 37/24; B32B 37/02; B32B 37/06; B32B 37/146; B32B 38/0036;
(Continued)

(56) References Cited

U.S. PATENT DOCUMENTS 2,744,042 A * 5/1956 Pace ................ H01Q 1/424
264/46.7
6,635,202 B1 * 10/2003 Bugg ................ B29C 67/04
52/576
(Continued)

FOREIGN PATENT DOCUMENTS

DE           37 20 371 A1    1/1989
DE   10 2013 223 347 A1    5/2015
(Continued)

OTHER PUBLICATIONS

Machine translation of DE 202018107378 date unknown.*
(Continued)

*Primary Examiner* — John L Goff, II
(74) *Attorney, Agent, or Firm* — KDW FIRM PLLC

(57) ABSTRACT

A method for producing a composite component including a bottom layer, cover layer and honeycomb structure, including applying the honeycomb structure to the bottom layer wherein honeycomb chambers are formed. Honeycomb chambers are filled in a reinforcement region with a granular material and granular material is removed from other honeycomb chambers wherein each honeycomb chamber is filled up to a granular-material filling height and honeycomb chambers outside the reinforcement region are free of granular material. The cover layer is applied to the honeycomb structure wherein the honeycomb chambers are closed. The composite component is heated so the granular material in the honeycomb chambers expands to fill it with granular material and the cover layer, the bottom layer, the honeycomb structure and the expanded granular material harden, the density of the expanded granular material in the honeycomb chambers filled with granular material being dependent on the granular-material filling height.

17 Claims, 4 Drawing Sheets

(51) Int. Cl.
  *B32B 37/02* (2006.01)
  *B32B 37/06* (2006.01)
  *B32B 37/14* (2006.01)
  *B32B 38/00* (2006.01)
  *B32B 38/16* (2006.01)
  *B32B 38/08* (2006.01)

(52) U.S. Cl.
  CPC ........ *B32B 37/146* (2013.01); *B32B 38/0036* (2013.01); *B32B 38/162* (2013.01); *B32B 38/08* (2013.01); *B32B 2038/0076* (2013.01); *B32B 2038/0088* (2013.01); *B32B 2250/03* (2013.01); *B32B 2250/40* (2013.01); *B32B 2264/203* (2020.08); *B32B 2305/024* (2013.01); *B32B 2305/30* (2013.01); *B32B 2305/72* (2013.01); *B32B 2309/02* (2013.01); *B32B 2309/72* (2013.01); *B32B 2605/18* (2013.01)

(58) Field of Classification Search
  CPC ................. B32B 38/08; B32B 38/162; B32B 2038/0076; B32B 2038/0088; B32B 2250/03; B32B 2250/40; B32B 2264/203; B32B 2305/024; B32B 2305/30; B32B 2305/72; B32B 2309/02; B32B 2309/72; B32B 3/12; B29C 44/186; B29C 44/445; B29C 44/3461; B29C 44/54; B29C 66/7254; B29C 66/72525

USPC .......................................................... 156/64
See application file for complete search history.

(56) References Cited

U.S. PATENT DOCUMENTS

2006/0000186 A1    1/2006  Carlson et al.
2008/0086982 A1*   4/2008  Parenteau ............... E04C 2/365
                                                      52/794.1
2016/0302633 A1*  10/2016  Lucas ....................... A47L 9/02

FOREIGN PATENT DOCUMENTS

DE       202018107378 U1 *  2/2019  .............. B32B 3/12
EP              0 514 623 A2  11/1992
WO       WO-2007099452 A2 *  9/2007  .......... B31D 3/0284
WO          WO 2015/059622 A1  4/2015
WO          WO 2015/071239 A1  5/2015

OTHER PUBLICATIONS

International Search Report and Written Opinion for Application No. PCT/EP2020/070327 dated Sep. 15, 2020.
German Search Report for Application No. 102019120548 dated Feb. 7, 2020.
International Preliminary Report on Patentability for Application No. PCT/EP2020/070327 dated Jul. 17, 2020.

* cited by examiner

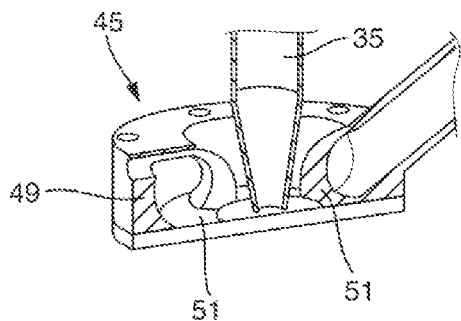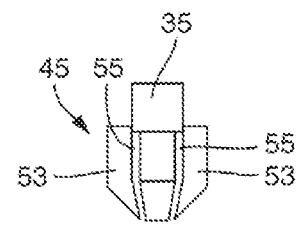
Fig. 6A            Fig. 6B
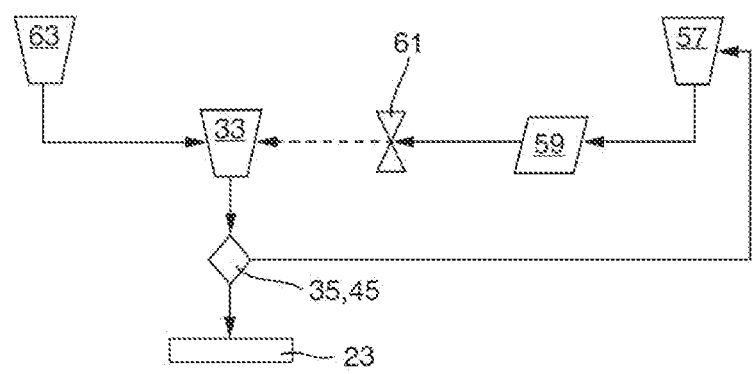
Fig. 7

METHOD FOR PRODUCING A COMPOSITE COMPONENT

CROSS-REFERENCE TO RELATED APPLICATIONS

This application is a continuation of and claims priority to Patent Application No. PCT/EP2020/070327 filed Jul. 17, 2020, which claims priority to German Patent Application No. 10 2019 120 548.4 filed Jul. 30, 2019, the entire disclosures of which are incorporated by reference herein.

TECHNICAL FIELD

The subject matter herein relates to a method for producing a composite component as well as to a composite component produced by such a method.

BACKGROUND

Composite components of this type have at least a base layer, a cover layer and a honeycomb structure disposed between the base layer and the cover layer. The base layer and the cover layer can be formed, for example, from one or a plurality of tiers of a prepreg material. The honeycomb structure extends between the base layer and the cover layer, having a multiplicity of individual, mutually separated honeycomb chambers, thus cavities. In order for the composite components to be able to be cut or for other elements to be able to be fastened to the composite components, the latter in reinforcement regions have to be reinforced in that individual honeycomb chambers of the honeycomb structure are completely filled.

For example, viscous or pasty, respectively, honeycomb filler materials can be used for reinforcing. To this end, for example, epoxy resins which are mixed with micro balloons of glass are used, wherein the density of the honeycomb filler material can be varied by way of the proportion of the micro balloons. The honeycomb filler materials are incorporated into the honeycomb chambers and cured conjointly with the honeycomb structure as well as the base layer and the cover layer. However, the processing and storing of the honeycomb filler material is complex. For example, the latter has to be stored at −18° C. and after having been thawed to the processing temperature can be stored for at most five days. Moreover, the honeycomb filler material adheres to the honeycomb structure, the base layer and the cover layer so that cleaning of the composite component is extremely complex should the honeycomb filler material make its way into honeycomb chambers or honeycomb cells that are not to be filled.

By virtue of these and further disadvantages, spherical pellets which expand under heat and can be used instead of the pasty honeycomb filler materials are known from WO 2015/059622 A1, for example. The honeycomb chambers of the composite component are completely filled with pellets before the cover layer is applied. The composite component thereafter is heated such that the pellets expand and cure in order to herein connect to the honeycomb structure as well as to the cover layer and the base layer.

SUMMARY

Against this background, it is an object of the disclosure herein to provide an improved method for producing a composite component as well as a composite component produced by the method.

The present object is achieved by a method as well as by a composite component disclosed herein. Preferred embodiments of the method are disclosed herein.

According to a first aspect, the object is achieved by a method for producing a composite component, wherein the composite component comprises a base layer, a cover layer and a honeycomb structure disposed between the base layer and the cover layer. The method comprises the following steps:

a) applying the honeycomb structure to the base layer such that a multiplicity of honeycomb chambers which are open on a side pointing away from the base layer are formed;

b) filling honeycomb chambers in a reinforcement region with granules during a filling procedure, wherein the granules at a processing temperature at which the filling procedure is carried out do not adhere to the honeycomb structure, the base layer or one another;

c) removing granules to be removed from honeycomb chambers such that, after the filling of honeycomb chambers and the subsequent removal of granules to be removed, each honeycomb chamber in the reinforcement region is filled with the granules up to a granule filling level and honeycomb chambers outside the reinforcement region are free of granules;

d) applying the cover layer to the honeycomb structure such that the multiplicity of honeycomb chambers are closed; and e) heating the composite component to a first processing temperature at which the granules filled into the honeycomb chambers expand so as to fill up the honeycomb chambers filled with granules, and to a second processing temperature at which the cover layer, the base layer, the honeycomb structure as well as the expanded granules cure, wherein a density of the expanded granules in the honeycomb chambers filled with granules depends on the granule filling level.

In other words, in the method for producing a composite component, for example a cladding element for a cargo space or the passenger cabin of an aircraft, a base plate or elements of a monument or lavatory for an aircraft cabin, a honeycomb structure which may be prefabricated is first placed onto a base layer and adhesively bonded to the latter, for example. The base layer can be one or a plurality of tiers of a prepreg material, for example. As a result of the honeycomb structure being disposed on the base layer, a multiplicity of individual honeycomb chambers or honeycomb cells which are hollow or empty, respectively, are in each case mutually separated and can be filled with granules from a side that points away from the base layer are created. The cross sections of the honeycomb chambers parallel to the base layer are preferably hexagonal but may also assume other shapes.

The granules are filled into the honeycomb chambers in a reinforcement region at a processing temperature. The reinforcement region comprises, for example, all honeycomb chambers through which a cut edge is intended to run, as well as such honeycomb chambers which are to be reinforced for fastening other components, for example. Additionally, the reinforcement region can also comprise directly adjacent or further honeycomb chambers, for example. The reinforcement region of a composite component can be uniform, thus be a closed area, or can preferably be subdivided into a plurality of sub-portions or sub-regions that are not necessarily connected to one another.

The granules used for filling the honeycomb chambers are free-flowing at the processing temperature, i.e. the granules can be poured and the individual grains of the granules do not adhere to one another or adhere to one another only in a readily releasable manner. At the processing temperature, the granules also do not adhere to the base layer, the cover layer and the honeycomb structure. For example, the processing takes place at a processing temperature which is between 5° C. and 30° C., preferably between 10° C. and 25° C., more preferably between 15° C. and 20° C., and at which the granules have the aforementioned properties. The spherical pellets which are known from WO 2010/059622 A1 and have a diameter between 0.5 mm and 0.9 mm can be used as granules, for example.

A CNC metering device which automatically fills honeycomb chambers situated in the reinforcement regions with the granules can be used for filling the honeycomb chambers with the granules, for example. Suitable sensors for checking and optionally correcting a position of a metering head of the metering device relative to the composite component can be used here. However, it is also conceivable for honeycomb chambers to be manually filled.

The objective of the filling procedure is to fill each honeycomb chamber up to a granule filling level with the granules. The granule filling level can be identical for all honeycomb chambers within the reinforcement region. This has the advantage that the controlling of the metering device is simplified, and a uniform distribution of the granules can be achieved without complex open-loop and/or closed-loop control processes being required to this end.

However, it is also possible to provide different granule filling levels for different portions of the reinforcement region. In one preferred embodiment, different granule filling levels are provided for different sub-regions. Different filling levels may also be provided within one sub-region. The weight and the load-bearing capability of the composite component can be varied by way of the granule filling level, because sub-regions having different granule filling levels after the expanding and curing of the granules have different densities, wherein the density decreases as the granule filling level decreases.

The envisaged granule filling level is preferably achieved in two alternative ways. In a first preferred embodiment, honeycomb chambers in the reinforcement region during the filling procedure are first completely filled up with the granules. Subsequently, the granules are removed again from the completely filled-up honeycomb chambers until each honeycomb chamber in the reinforcement region is filled up to the granule filling level with granules. The granules are preferably suctioned. For example, granules can be suctioned again from one or a plurality of other honeycomb chambers even while one honeycomb chamber is being filled during the filling procedure. This has the advantage that a metering device having an upright column in which no variation of the granular flow, thus the quantity of granules incorporated into the honeycomb chambers per unit of time, is necessary can be used for filling the honeycomb chambers. For example, optical sensors or ultrasonic sensors by way of which the filling level can be continuously detected can be used here.

An incorporation of the granules into the honeycomb chambers is alternatively monitored in a preferred manner during the filling procedure such that the honeycomb chambers in the reinforcement region are filled only up to the granule filling level. For example, optical sensors or ultrasonic sensors which continuously measure the filling level can also be used to this end. The currently measured filling level can then be transmitted to a metering installation or metering device which by the received data continuously adapts the flow of the granules. Alternatively, it is also possible for the filling level of the granules to be varied in that the speed at which a metering head of a metering machine moves across the open honeycomb chambers of the composite component is adapted.

Once the honeycomb chambers have been filled, or even while other honeycomb chambers are being filled, granules are additionally removed again from the honeycomb chambers that lie outside the reinforcement regions and are not to be reinforced. The granules to be removed can be, for example, granules that have spilled from adjacent honeycomb chambers or by virtue of a limited accuracy of the filling procedure have made their way into the honeycomb chambers outside the reinforcement regions. The granules to be removed are preferably also suctioned. The weight of the composite component is advantageously optimized in that the honeycomb chambers that lie outside the reinforcement region are cleaned of excess granules, because no honeycomb chambers are expanded which do not have to be expanded.

Once all honeycomb chambers have been filled up to the respective granule filling level, the cover layer is disposed on the honeycomb structure, thus closing the multiplicity of honeycomb chambers. Subsequently, the entire composite board is heated to a first process temperature at which the granules foam or expand, respectively, and fill the remaining voids between the individual grains as well as above the granule filling level. The density of the foam emerging in the individual chambers of the honeycomb structure here depends decisively on the granule filling level up to which the respective chamber has been filled so that the density and thus the load-bearing capability of the composite component can advantageously be managed for each individual honeycomb chamber. The weight and the load-bearing capability of the composite component can thus be mutually adapted in an optimal manner.

Subsequently, the entire composite component is heated to a second process temperature at which the base layer, the cover layer, the honeycomb structure and the expanded granules cure. In one preferred embodiment, the first and the second process temperature are identical, as a result of which the method is easier to carry out. Moreover, a pressure can be exerted on the cover layer while heating the composite component to the first and/or the second process temperature so that the elements of the composite component connect to one another and lifting of the cover layer as a result of the expanding granules is avoided.

In one preferred embodiment, granules previously removed from honeycomb chambers are re-used for filling other honeycomb chambers, wherein the granules previously removed from honeycomb chambers are furthermore preferably cleaned before being re-used. The proportion of the granules that can actually be used for the production of composite components can be improved by re-using the removed, for example suctioned, granules. The proportion of waste material is thus minimized.

In one preferred embodiment, an actual filling level of each honeycomb chamber is checked and, should the actual filling level in a honeycomb chamber exceed the granule filling level plus a tolerance, granules are removed from the respective honeycomb chamber. It is thus ensured that the filling level and thus the emerging density of the composite component in the respective honeycomb chamber correspond to the specifications. Since the dimensions of the granules are finite, it is technically impossible to adhere exactly to the filling level. Deviations from the envisaged granule filling level are defined by the tolerance, the density of the expanded granules being in an envisaged range when the tolerance is undershot and the completed composite component thus being able to meet the requirements in terms of the load-bearing capability thereof and the weight thereof.

It is furthermore preferable when honeycomb chambers which are to be completely filled up are initially overfilled such that granules protrude from the honeycomb chambers to be completely filled up, and granules protruding from the honeycomb chambers to be completely filled up are subsequently removed by a scraper. It can be achieved in this way that the honeycomb chambers are completely filled and only such granules that protrude from the honeycomb chamber are actually removed when retrieving the excess granules. It is preferable here for the granules removed by the scraper to be suctioned on the scraper. It is thus avoided that the granules are displaced into other honeycomb chambers and a granule filling level other than that provided is set in the latter, or the honeycomb chambers are filled with granules in the first place, despite this not being envisaged.

It is furthermore preferable for the base plate having the applied honeycomb structure to be set in vibration during the filling procedure so as to distribute the granules uniformly in the individual honeycomb chambers. A non-uniform distribution of the granules in the honeycomb chambers is thus avoided.

In one preferred embodiment, the honeycomb chambers filled with granules are ventilated when heating the composite component to the first process temperature. To this end, the cover layer which otherwise is stressed with a tool while heating to the first and the second process temperature is preferably destressed for ventilation intervals such that the air situated in the honeycomb chambers can escape between the cover layer and the honeycomb structure without causing damage to the honeycomb structure. Alternatively or additionally, the cover layer may also be provided with openings such that the air can escape from the honeycomb chambers through the cover layer. Alternatively or additionally, it is furthermore possible to configure the honeycomb chambers so as to be permeable, for example in that the honeycomb structure is provided with slots so that the air displaced from one honeycomb chamber can escape into other honeycomb chambers.

In a second aspect, the problem underlying the disclosure herein is solved by a composite component which has been produced by a method according to one of the embodiments described above. The advantages of the composite component correspond to the advantages of the method by way of which the composite components have been produced.

BRIEF DESCRIPTION OF THE DRAWINGS

The disclosure herein will be explained in more detail hereunder with reference to the drawing in which:

FIG. 6A shows a perspective sectional view of a third example of a metering head having a suction installation;

FIG. 6B shows a perspective sectional view of a fourth example of a metering head having a suction installation; and FIG. 7 shows a schematic illustration of processing granules during an example method for producing a composite component.

Figure 1:
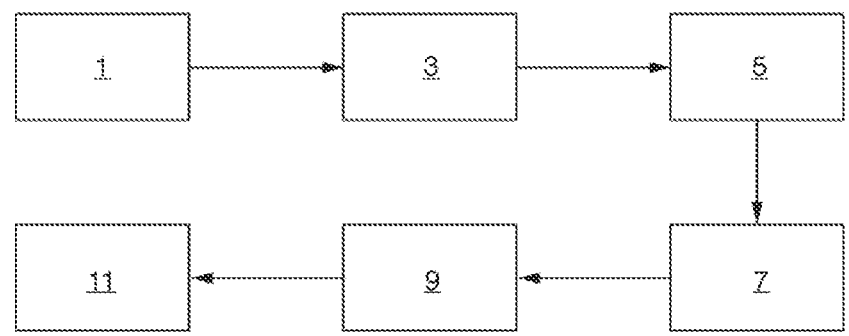
FIG. 1 shows a flow chart of an example method for producing a composite component.

An example embodiment of a method according to the disclosure herein for producing a composite component according to the disclosure herein will be explained hereunder. A flow chart having steps 1, 3, 5, 7, 9, 11 of the example embodiment of a method according to the disclosure herein is shown in FIG. 1. Steps 1, 3, 5, 7, 9, 11 of the method will be explained in more detail hereunder with reference to FIG. 1 and the other figures. Identical elements are identified by the same reference sign in all of the figures.

Figure 2A:
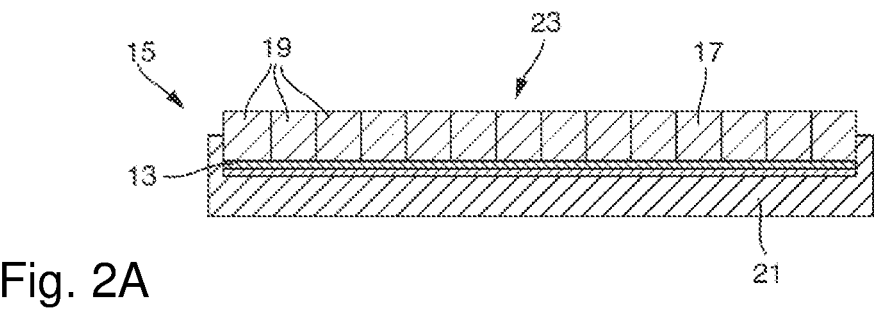
FIG. 2A shows a vertical sectional view of a composite component while carrying out the method from FIG. 1.

As is illustrated in FIG. 2A, in a first method step 1, a honeycomb structure 17 is disposed on a base layer 13 of the composite component 15 to be produced, which can also be referred to as a composite 15. The base layer 13 consists of or comprises a multiplicity of tiers of prepreg materials which are not individually identified in the figures. As a result of the disposal of the honeycomb structure 17 on the base layer 13, a multiplicity of honeycomb chambers 19 illustrated only in FIG. 2A are created. Each honeycomb chamber 19 is a cavity which on the side pointing away from the base layer 13 is open. Only a few of the honeycomb chambers 19 have been provided with a reference sign in order to avoid that FIG. 2A loses clarity by virtue of an excessively large number of reference signs. For the same reason, the illustration of individual honeycomb chambers 19 has been dispensed with in the remaining figures. The workpiece 23 composed of the base layer 13 and the honeycomb structure 17 is disposed on a tool 21.

Figure 2B:
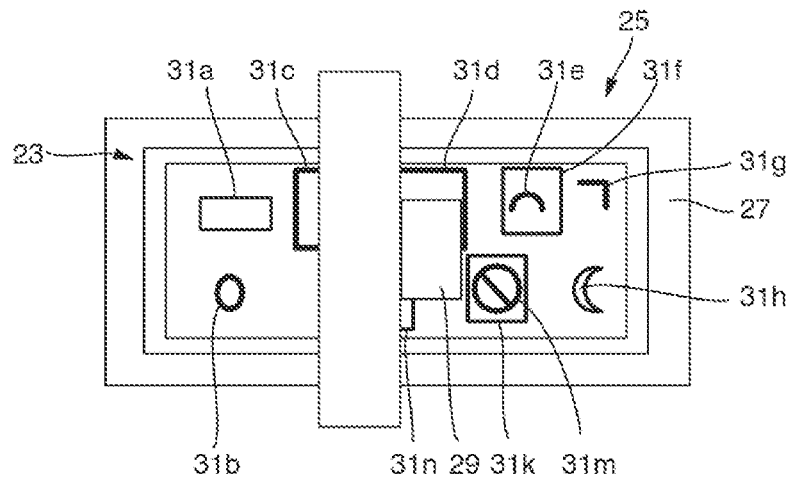
FIG. 2B shows a plan view of the composite component from FIG. 2A having a schematically illustrated metering device.

Prior to carrying out the second method step 3, the workpiece 23 is disposed in a metering system 25 which comprises a table 27 and a metering device 29 which is able to travel across the table 27, the table 27 and the metering device 29 being illustrated in more detail in FIG. 2B. In the second method step, those honeycomb chambers 19 of the workpiece 23 that are situated in a reinforcement region 31, which is illustrated in FIG. 2B, are then filled with granules. Specifically, the reinforcement region 31 of the workpiece 23 comprises a multiplicity of sub-regions 31a, 31b, 31c, 31d, 31e, 31f, 31g, 31h, 31k, 31m, 31n where the composite component 15 to be produced is to be reinforced for various reasons. Each sub-portion 31a, 31b, 31c, 31d, 31e, 31f, 31g, 31h, 31k, 31m, 31n has only been identified by the respective unequivocal reference sign and not additionally by the general reference sign 31 pertaining to the reinforcement region, so as not to overload FIG. 2B. However, the reference sign 31 conjointly denotes all sub-portions 31a, 31b, 31c, 31d, 31e, 31f, 31g, 31h, 31k, 31m, 31n. As can likewise be seen in FIG. 2B, the sub-portions 31f, 31h, 31k, 31n have already been filled with the granules, while the other sub-portions 31a, 31b, 31c, 31d, 31e, 31g, 31m have yet to be filled. The table 27 of the metering system 25 can be set in vibration while filling the honeycomb chambers 19 so that the incorporated granules are distributed uniformly in the respective filled honeycomb chamber 19, i.e. each individual honeycomb chamber 19.

The metering device 29, which in various embodiments will be described in more detail hereunder with reference to FIGS. 3A to 7, is used for filling the honeycomb chambers 19. The metering device 29, also referred to as a CNC metering device 29, is monitored by a control computer (not illustrated) and automatically fills completely the honeycomb chambers 19 of the workpiece 23 according to previously defined items of control information, the latter being able to be predefined in the form of CAD data, for example. To this end, the device 29 can be moved in three axes (parallel to the plane of the tool as well as perpendicular to this plane) and control the volumetric flow of granules, or suction excess granules again, respectively.

Figures 3A, 3B:
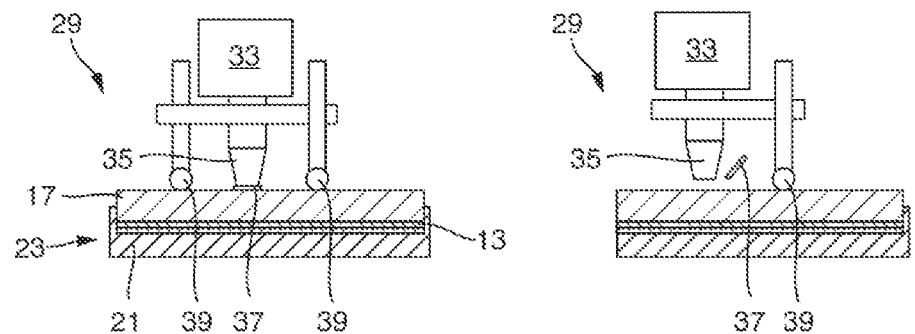
FIG. 3A shows a lateral view of a first example for a metering device for filling honeycomb chambers of a composite component with granules.
FIG. 3B shows a lateral view of a second example for a metering device for filling honeycomb chambers of a composite component with granules.

Examples of metering devices 29, which can in each case be used as part of the metering system 25 from FIG. 2B, are shown in FIGS. 3A and 3B. The metering devices 29 comprise in each case one hopper 33 for the granules, the latter being, for example, spherical pellets which are known from WO 2010/059622 A1 and have a diameter between 0.5 mm and 0.9 mm. Pellets with other dimensions can also be used. The grains of the granules, or the pellets, respectively, are designed such that they freely flow, thus do not adhere to one another, or adhere to one another only to a minor degree, and are readily suitable for pouring, at a processing temperature of preferably between 10° C. and 25° C. The granules moreover do not adhere to the honeycomb structure 17 and to the base layer 13, or adhere thereto only to a minor extent, so that the granules can be easily removed again.

Figures 4A, 4B, 4C:
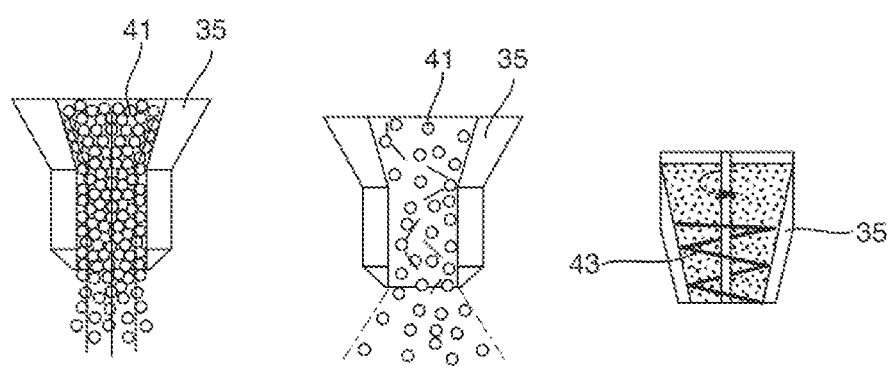
FIG. 4A shows a vertical sectional view of a first example of a metering head for a metering device.
FIG. 4B shows a vertical sectional view of a second example of a metering head for a metering device.
FIG. 4C shows a vertical sectional view of a third example of a metering head for a metering device.
Figure 5A:
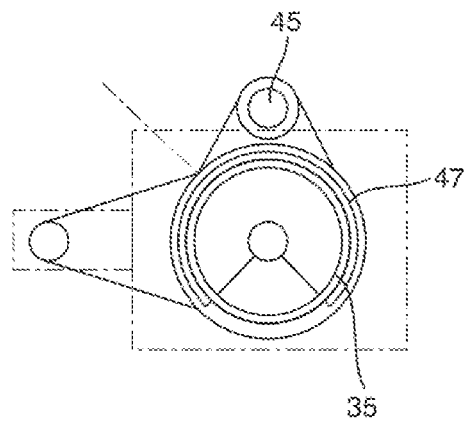
FIG. 5A shows a horizontal sectional view of a first example of a metering head having a suction installation.
Figure 5B:
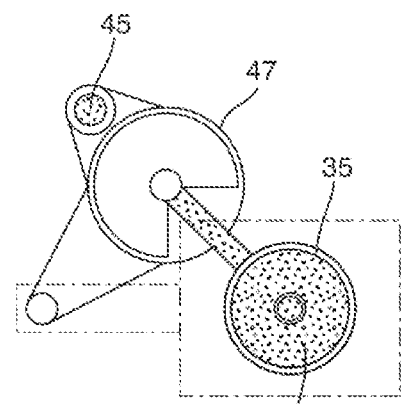
FIG. 5B shows a horizontal sectional view of a second example of a metering head having a suction installation.
Figure 5C:
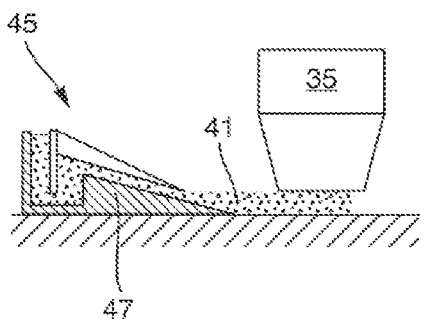
FIG. 5C shows a vertical sectional view of the metering head having a suction installation from FIG. 5B.

The granules from the hopper 33 are incorporated into the honeycomb chambers 19 by way of a respective metering head 35 which either bears directly on the honeycomb structure 17 (FIG. 3A) or is spaced apart from the honeycomb structure 17 (FIG. 3B). Each metering head 35 comprises a closure element 37 by way of which the flow of granules through the metering head 35 can be stopped. The closure element 37 can be, for example, a flap 37 as is shown in FIGS. 3A and 3B. However, other design embodiments in which a screw conveyor 43 is also used as a closure element 37 are also conceivable, as shown in FIG. 4C, for example. Moreover, provided are downholder units 39 by way of which the honeycomb structure 17 is pressed onto the base layer 13 during the filling procedure so as to prevent that the honeycomb structure 17 is released from the base layer 13.

Illustrated in FIGS. 4A to 4C are various embodiments of metering heads 35 which can in each case be used as a metering head 35 in the metering devices 29 shown in FIGS. 3A and 3B. The metering head 35 illustrated in FIG. 4A is used as an upright column for incorporating granules 41. The weight of the granules 41 situated in the hopper 33 here bears continuously on the granules 41 in the metering head 35 so that these granules 41 by way of a constant volumetric flow are forced out of the metering head 35 as a wide jet. This is particularly expedient when the honeycomb chambers 19 are to be completely filled with granules 41, and the metering head 35 bears directly on the honeycomb structure 17, as is shown in FIG. 3A.

A second embodiment in which the grains of the granules 41 drop freely from the metering head 35 is shown in FIG. 4B. This metering head 35 can in particular also be used when the honeycomb chambers 19 are not to be completely filled but filling is envisaged only up to a predefined granule filling level.

Finally shown in FIG. 4C is a third example embodiment of a metering head 35 which comprises a screw conveyor 43 by which the flow of the granules 41 can be controlled in a targeted manner. This embodiment is also particularly suitable when the honeycomb chambers 19 are to be filled only up to a specific granule filling level.

As has already been explained above, in the second method step 3 those honeycomb chambers 19 of the workpiece 23 that lie within the reinforcement region 31 are filled with the granules 41. It is the objective of the filling procedure to fill the honeycomb chambers 19 up to a predetermined granule filling level, wherein the granule filling level may be uniform for the entire reinforcement region 31, or else the granule filling levels are independently established for each sub-region 31a, 31b, 31c, 31d, 31e, 31f, 31g, 31h, 31k, 31m, 31n. Because the size of the sub-regions toward the bottom is only restricted by the size of the honeycomb chambers 19, an individual granule filling level which is between 100% (completely filled) and a minimum filling level can be fundamentally established for each honeycomb chamber 19. A granule filling level of 0% is not provided within the reinforcement region because the latter comprises only honeycomb chambers 19 filled with granules, and empty honeycomb chambers 19 lie outside the reinforcement region 31. The minimum filling level is preferably chosen such that the honeycomb chamber 19 after the complete expansion of the granules 41 is completely filled up and the lowest possible density of the expanded granules 41 is achieved.

The granule filling level can be achieved in two different ways. The honeycomb chambers 19 are either filled directly only up to the envisaged granule filling level including a tolerance range. To this end, the metering heads 35 shown in FIGS. 4B and 4C can in particular be used, the metering heads 35 moreover preferably having an optical, acoustic or capacitive sensor assembly by way of which the actual filling level can be continuously monitored. Alternatively, each honeycomb chamber 19 can first be completely filled before granules 41 are again removed from the honeycomb chambers 19 until the envisaged granule filling level is reached in the third method step 5.

Suitable to this end are in particular the metering heads 35 which are shown in FIGS. 5A to 6B, have an integrated suction device 45 and can likewise be used as the metering head 35 in the metering devices 29 shown in FIGS. 3A and 3B. The actual construction of the metering head 35 can correspond to that of one of the metering heads 35 from FIGS. 4A to 4C. Apart from the suction device 45, the metering heads shown in FIG. 5A as well as 5B and 5C comprise also a scraper 47 which is guided directly along a surface of the honeycomb structure 117 and picks up excess granules 41, as can be best seen in FIG. 5C. The picked-up granules 41 are subsequently suctioned by a vacuum by the suction device. In the embodiment shown in FIG. 5A, the scraper 47 and the suction device 45 are integrated directly in the metering head 35, while the scraper 47 and the suction device 45 in the embodiments shown in FIGS. 5B and 5C are disposed so as to be spaced apart. As a result thereof, the relative disposal of the scraper 47 and of the metering head 35 can be adapted to various filling geometries.

In the example embodiments shown in FIGS. 6A and 6B, the suction device 45 is integrated directly in the metering head 35. An annular cavity 49 which toward the honeycomb structure 17 has an annular opening 51 through which granules 41 can be suctioned from the honeycomb chambers 19 is thus provided in FIG. 6A, for example.

A similar arrangement is provided in the embodiment shown in FIG. 6B. The suction device 45 here additionally comprises one or a plurality of isolating elements 53 which can be lowered onto the surface of a honeycomb structure 17 so as to separate or isolate, respectively, an individual honeycomb chamber 19 from the remaining honeycomb chambers 19 in order to ensure that granules 41 are in each case incorporated only into the one honeycomb chamber 19, or suctioned only from the one honeycomb chamber 19, respectively. Excess granules here are suctioned through a gap 55 between the isolating elements 53 and the metering head 35.

In the third method step 5, however, excess granules 41 are not only removed from honeycomb chambers 41 which form part of the reinforcement region in order for the envisaged granule filling level to be achieved. Rather, granules 41 are additionally also suctioned from the honeycomb chambers 19 that lie outside the reinforcement region 31 and are therefore not to be reinforced. It is thus preferably avoided that the weight of the composite component 15 is unnecessarily increased.

The suctioned granules 41 can be advantageously re-used, as is schematically illustrated in FIG. 7. In the preferred embodiment which can be integrated in the metering system 25 from FIG. 2B, the granules 41 removed by the metering head 35 having the integrated suction device are first suctioned into a vacuum vessel 57 and from there directed onward into a cleaning station 59 in which the suctioned granules are treated. The cleaned granules by way of a mixing valve 61 are directed into the hopper 33 of the metering system 25 again, wherein the ratio between treated granules from the cleaning station 59 and fresh granules from a storage container 63 is set by the mixing valve 61 so as to ensure an adequate quality of the granules.

Figure 2C:
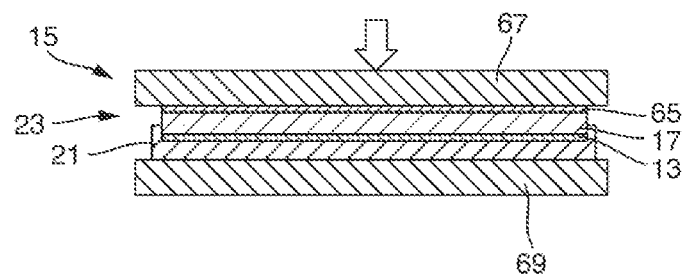
FIG. 2C shows a further vertical sectional view of the composite component from FIG. 2A while carrying out the method from FIG. 1.

Once all of the excess granules have been removed from the honeycomb chambers 19 so that all of the honeycomb chambers 19 within the reinforcement region 31 have been filled within a tolerance up to the respective granule filling level with granules 41 and have been completely removed, i.e. preferably as far as technically expedient, from all honeycomb chambers outside the reinforcement region 31, the cover layer 65 is applied to the workpiece 23 in the fourth method step 7, the cover layer 65 being illustrated in FIG. 2C.

In the fifth method step 9, the composite component 15 is finally heated to a first process temperature at which the granules 41 in the honeycomb chambers 19 expand and fill up the latter. To this end, the workpiece 25 is firmly held between an upper tool 67 and a lower tool 69 such that the workpiece 25 cannot be deformed. However, in order for the granules 41 to be able to expand without impediment, the upper tool 67 is lifted for ventilation intervals so that air which conjointly with the granules 41 is situated in the honeycomb chambers 19 can escape beforehand.

Finally, the workpiece 25 in a final sixth method step 11 is cured so as to form the composite component 15. To this end, the process temperature here is kept constant because the first process temperature at which the granules 41 expand or foam, respectively, and the second process temperature at which the expanded granules 41, the base layer 13, the honeycomb structure 17 and the cover layer 65 cure and connect to one another, are identical. The workpiece 25 is held between the upper and the lower tool 67, 69 also during the sixth method step 11.

A composite component 15 which has been locally reinforced in that granules 41 are incorporated in a targeted manner into honeycomb chambers 19 in the reinforcement region 31 and expanded therein has thus been produced by the example method. Because the filling level in the individual honeycomb chambers 19 can be set, it is moreover possible for the density of the expanded honeycomb chambers 19 to be adapted in a targeted manner to the arising loads and thus for an ideally positive balance between a sufficiently high load-bearing capability and a low weight of the composite component 15 to be achieved, this being particularly advantageous in the aerospace industry in which already minor reductions in weight are associated with significant savings in terms of fuel consumption. Moreover, the proportion of the granules 41 actually used in the composite component 15 can be significantly increased in comparison to conventional methods, because excess granules 41 can be suctioned, treated and further processed.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a composite component which comprises a base layer, a cover layer and a honeycomb structure disposed between the base layer and the cover layer, the method comprising:
    applying the honeycomb structure to the base layer to form a multiplicity of honeycomb chambers, which are open on a side pointing away from the base layer;
    filling honeycomb chambers in a reinforcement region with granules during a filling procedure, wherein the granules, at a processing temperature at which the filling is carried out, do not adhere to the honeycomb structure, the base layer, or one another;
    removing, when an actual filling level of one or more of the honeycomb chambers exceeds a granule filling level, a portion of the granules from the one or more honeycomb chambers such that, after the one or more honeycomb chambers have been filled with the granules and the portion of the granules have been removed, each of the honeycomb chambers in the reinforcement region is filled with the granules up to the granule filling level and honeycomb chambers outside of the reinforcement region are free of the granules;
    applying the cover layer to the honeycomb structure such that the honeycomb chambers are closed;
    heating the composite component to a first process temperature, at which the granules with which the honeycomb chambers are filled expand within the honeycomb chambers to form expanded granules; and subsequently, heating the composite component to a second process temperature, at which the cover layer, the base layer, the honeycomb structure, and the expanded granules cure;

wherein a density of the expanded granules in the honeycomb chambers depends on the granule filling level;

wherein a portion of the granules is removed and granules of the portion of the granules removed from the honeycomb chambers are re-used for filling other honeycomb chambers; and wherein the granules of the portion of the granules removed from the honeycomb chambers are cleaned prior to being re-used.

2. The method of claim 1, wherein the honeycomb chambers in the reinforcement region during the filling procedure are first completely filled up with the granules, and the portion of the granules is subsequently removed from the completely filled-up honeycomb chambers until each of the honeycomb chambers in the reinforcement region is filled up to the granule filling level with the granules.

3. The method of claim 1, comprising checking the actual filling level of each of the honeycomb chambers during the filling procedure.

4. The method of claim 1, wherein the reinforcement region has a plurality of sub-regions which are not necessarily connected to one another.

5. The method of claim 4, wherein different granule filling levels are provided for different sub-regions of the reinforcement region, wherein sub-regions having different granule filling levels have different densities after the expansion and curing of the granules.

6. The method of claim 1, wherein the base layer having the applied honeycomb structure is set in vibration during the filling procedure to distribute the granules uniformly in the honeycomb chambers.

7. The method of claim 1, wherein the honeycomb chambers filled with granules are ventilated when heating the composite component to the first process temperature.

8. The method of claim 7, wherein, for ventilating the honeycomb chambers filled with granules, the cover layer which otherwise is stressed with a tool while heating to the first and the second process temperature is destressed for ventilation intervals such that air displaced from the honeycomb chambers can escape.

9. The method of claim 1, wherein the portion of the granules removed are suctioned.

10. A method for producing a composite component which comprises a base layer, a cover layer and a honeycomb structure disposed between the base layer and the cover layer, the method comprising:

applying the honeycomb structure to the base layer to form a multiplicity of honeycomb chambers, which are open on a side pointing away from the base layer;

filling honeycomb chambers in a reinforcement region with granules during a filling procedure, wherein the granules, at a processing temperature at which the filling is carried out, do not adhere to the honeycomb structure, the base layer, or one another;

removing, when an actual filling level of one or more of the honeycomb chambers exceeds a granule filling level, a portion of the granules from the one or more honeycomb chambers such that, after the one or more honeycomb chambers have been filled with the granules and the portion of the granules have been removed, each of the honeycomb chambers in the reinforcement region is filled with the granules up to a granule filling level and honeycomb chambers outside of the reinforcement region are free of the granules;

applying the cover layer to the honeycomb structure such that the honeycomb chambers are closed;

heating the composite component to a first process temperature, at which the granules with which the honeycomb chambers are filled expand within the honeycomb chambers to form expanded granules; and subsequently, heating the composite component to a second process temperature, at which the cover layer, the base layer, the honeycomb structure, and the expanded granules cure;

wherein a density of the expanded granules in the honeycomb chambers depends on the granule filling level;

wherein a quantity of the honeycomb chambers are completely filled up and are, during the filling procedure, initially overfilled such that there are excess granules that protrude from the quantity of the honeycomb chambers, the excess granules protruding from each of the quantity of the honeycomb chambers being subsequently removed by a scraper; and wherein the excess granules removed by the scraper are suctioned on the scraper.

11. The method of claim 10, wherein an actual filling level of each of the honeycomb chambers being filled is checked, such that the portion of the granules is only removed from a respective honeycomb chamber being filled when the actual filling level in the respective honeycomb chamber being filled exceeds the granule filling level.

12. The method of claim 10, wherein the reinforcement region has a plurality of sub-regions which are not necessarily connected to one another.

13. The method of claim 12, wherein different granule filling levels are provided for different sub-regions of the reinforcement region, wherein sub-regions having different granule filling levels have different densities after the expansion and curing of the granules.

14. The method of claim 10, wherein the base layer having the applied honeycomb structure is set in vibration during the filling procedure to distribute the granules uniformly in the honeycomb chambers.

15. The method of claim 10, wherein the honeycomb chambers filled with granules are ventilated when heating the composite component to the first process temperature.

16. The method of claim 15, wherein, for ventilating the honeycomb chambers filled with granules, the cover layer which otherwise is stressed with a tool while heating to the first and the second process temperature is destressed for ventilation intervals such that air displaced from the honeycomb chambers can escape.

17. The method of claim 10, wherein the portion of the granules removed are suctioned.

* * * * *